(12) United States Patent
Abuelsaad et al.

(10) Patent No.: US 10,970,910 B2
(45) Date of Patent: Apr. 6, 2021

(54) ANIMATION OF CONCEPTS IN PRINTED MATERIALS

(71) Applicant: International Business Machines Corporation, Armonk, NY (US)

(72) Inventors: Tamer Abuelsaad, Yorktown Heights, NY (US); Kuntal Dey, New Delhi (IN); Seema Nagar, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/107,695

(22) Filed: Aug. 21, 2018

(65) Prior Publication Data

US 2020/0066021 A1 Feb. 27, 2020

(51) Int. Cl.

| | | |
|---|---|---|
| *G06F 17/20* | (2006.01) | |
| *G06T 13/80* | (2011.01) | |
| *G06F 3/01* | (2006.01) | |
| *G06K 9/00* | (2006.01) | |
| *G10L 15/07* | (2013.01) | |
| *G06F 40/205* | (2020.01) | |

(52) U.S. Cl.
CPC .............. *G06T 13/80* (2013.01); *G06F 3/013* (2013.01); *G06F 40/205* (2020.01); *G06K 9/00302* (2013.01); *G10L 15/07* (2013.01)

(58) Field of Classification Search
CPC ... G06F 40/205; G06F 3/013; G06K 9/00302; G06T 13/80; G10L 15/07
See application file for complete search history.

(56) References Cited

U.S. PATENT DOCUMENTS

| | | | | |
|---|---|---|---|---|
| 4,854,878 A | * | 8/1989 | Malvino | ................ G09B 5/065 |
| | | | | 434/335 |
| 9,310,882 B2 | | 4/2016 | Kochi | |
| 9,462,175 B2 | | 10/2016 | Kim | |
| 9,478,143 B1 | * | 10/2016 | Bowen | ..................... G09B 5/06 |
| 2001/0049596 A1 | * | 12/2001 | Lavine | ................ G06F 17/2785 |
| | | | | 704/9 |
| 2007/0219986 A1 | * | 9/2007 | Egozi | ..................... G06F 16/313 |
| 2007/0238075 A1 | * | 10/2007 | Mauch | ................... G09B 19/00 |
| | | | | 434/156 |

(Continued)

FOREIGN PATENT DOCUMENTS

WO    WO02099627 A1    12/2002

*Primary Examiner* — Keith D Bloomquist
(74) *Attorney, Agent, or Firm* — Ference & Associates LLC

(57) ABSTRACT

One embodiment provides a method, including: tracking a reading position of a reader with respect to text of printed material; detecting an area of the printed material of interest to the reader, wherein the detecting comprises correlating a reading position with an indication of interest provided by the reader; identifying a concept corresponding to the area of interest, wherein the identifying a concept comprises (i) parsing the text of the area of interest and (ii) extracting at least one concept from the text; generating an animation for the concept by (i) accessing an image related to the concept, (ii) identifying a portion of the image to animate, and (iii) animating the portion of the image; and providing, on an information handling device, the generated animation to the reader.

17 Claims, 2 Drawing Sheets

(56) References Cited

U.S. PATENT DOCUMENTS

2008/0140412 A1* 6/2008 Millman .................. G09B 7/02
              704/270
2013/0151955 A1 6/2013 Williams
2015/0072335 A1 3/2015 Pedanekar et al.
2016/0070366 A1 3/2016 Pinheiro De Figueiredo et al.

* cited by examiner

ANIMATION OF CONCEPTS IN PRINTED MATERIALS

BACKGROUND

People access printed materials, including both digitally printed materials (e.g., books provided in a digital format, Internet sites having news articles, digital publications, etc.) and physically printed materials (e.g., newspapers, magazines, books, etc.), for learning, entertainment, relaxing, or the like. Many times printed materials are provided in both digital and physical formats, for example, a physical book may have a corresponding digital format, thus allowing a person to access the printed material in the format that is most convenient at the time. The printed materials may not only contain text for reading, but may also contain images that may illustrate a scene or concept within the text. For example, a children's book may include text describing a beanstalk and may also include an image or illustration of the beanstalk. As another example, a learning textbook may include a description of components of a motor and may also include a cutaway image where each of the components is illustrated and identified.

BRIEF SUMMARY

In summary, one aspect of the invention provides a method comprising: tracking a reading position of a reader with respect to text of printed material; detecting an area of the printed material of interest to the reader, wherein the detecting comprises correlating a reading position with an indication of interest provided by the reader; identifying a concept corresponding to the area of interest, wherein the identifying a concept comprises (i) parsing the text of the area of interest and (ii) extracting at least one concept from the text; generating an animation for the concept by (i) accessing an image related to the concept, (ii) identifying a portion of the image to animate, and (iii) animating the portion of the image; and providing, on an information handling device, the generated animation to the reader.

Another aspect of the invention provides an apparatus, comprising: at least one processor; and a computer readable storage medium having computer readable program code embodied therewith and executable by the at least one processor, the computer readable program code comprising: computer readable program code configured to track a reading position of a reader with respect to text of printed material; computer readable program code configured to detect an area of the printed material of interest to the reader, wherein the detecting comprises correlating a reading position with an indication of interest provided by the reader; computer readable program code configured to identify a concept corresponding to the area of interest, wherein the identifying a concept comprises (i) parsing the text of the area of interest and (ii) extracting at least one concept from the text; computer readable program code configured to generate an animation for the concept by (i) accessing an image related to the concept, (ii) identifying a portion of the image to animate, and (iii) animating the portion of the image; and computer readable program code configured to provide, on an information handling device, the generated animation to the reader.

An additional aspect of the invention provides a computer program product, comprising: a computer readable storage medium having computer readable program code embodied therewith, the computer readable program code executable by a processor and comprising: computer readable program code configured to track a reading position of a reader with respect to text of printed material; computer readable program code configured to detect an area of the printed material of interest to the reader, wherein the detecting comprises correlating a reading position with an indication of interest provided by the reader; computer readable program code configured to identify a concept corresponding to the area of interest, wherein the identifying a concept comprises (i) parsing the text of the area of interest and (ii) extracting at least one concept from the text; computer readable program code configured to generate an animation for the concept by (i) accessing an image related to the concept, (ii) identifying a portion of the image to animate, and (iii) animating the portion of the image; and computer readable program code configured to provide, on an information handling device, the generated animation to the reader.

A further aspect of the invention provides a method, comprising: identifying an area within printed material (i) corresponding to a reading position of a reader who is reading the printed material and (ii) that is determined to be an area having a concept whose animation would benefit the reader; generating animation of the concept, wherein the generating the animation comprises (i) accessing an image related to the concept, (ii) determining a portion of the image to animate based upon identifying at least one action of the concept, and (iii) animating the portion of the image to illustrate the at least one action of the concept; and providing, on an information handling device, the animation to the reader.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
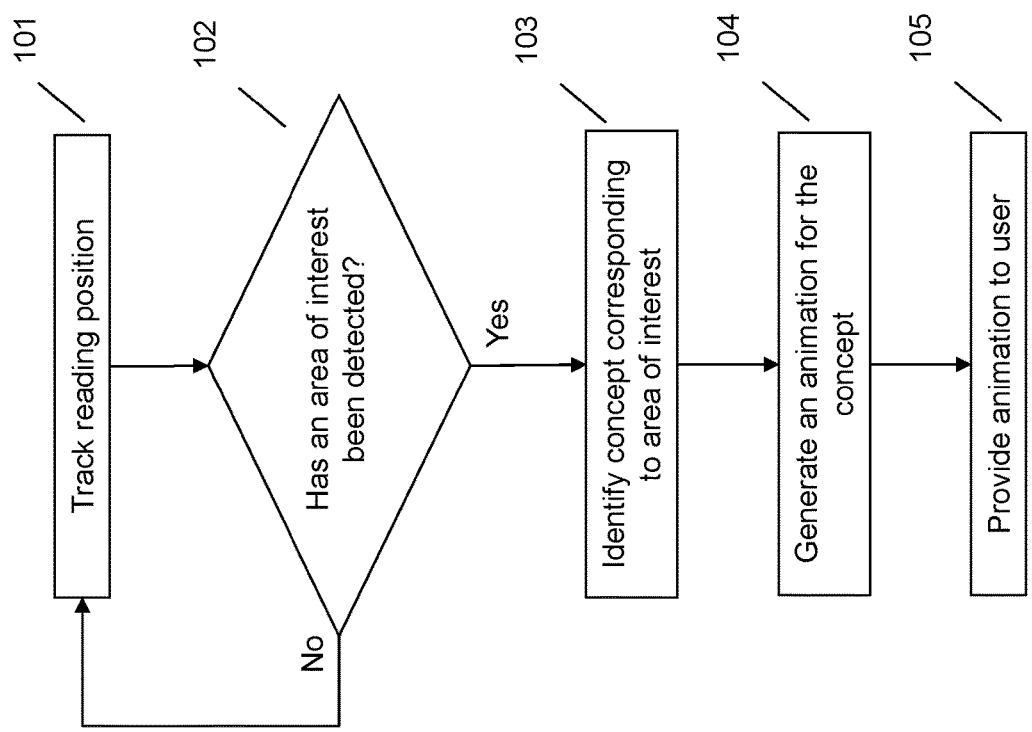
FIG. 1 illustrates a method of generating and providing animations of concepts in printed material being read by a user.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-2. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 2. In accordance with an example embodiment, all of the process steps, components and outputs discussed with respect to FIG. 1 can be performed or utilized by way of a processing unit or units and system memory such as those indicated, respectively, at 16' and 28' in FIG. 2, whether on a server computer, a client computer, a node computer in a distributed network, or any combination thereof.

Images or illustrations included in printed material may assist a reader in understanding or imagining a corresponding concept within the text of the printed material. However, due to the size of printed materials, not all concepts are illustrated or include a corresponding image within the printed material. Additionally, many printed materials do not include any images or illustrations at all. Thus, the reader is left to either imagine the concept identified in the printed material or access a secondary source to find an image illustrating the concept. Imagining the concept may be difficult for a reader, particularly if the reader is unfamiliar with the concept or if the concept is complex. Attempting to find a corresponding image using a secondary source may present challenges. For example, without an understanding of the concept the reader may have difficulty providing search terms that result in an accurate illustration. As another example, even if the reader is successful in finding an image, the reader may still not understand the concept or may not be able to determine if the image is an accurate representation of the concept. Additionally, having to access a secondary source to find an image may be time consuming and may result in frustration and confusion for the reader.

One type of image or illustration that may be particularly helpful for a reader in understanding a concept is animation. However, actual animations may only be provided in digital format, for example, in the form of a video. Illustrating animations in physical printed materials may be attempted through the use of arrows or movement markers or through the use of multiple images that illustrate a first position of the object and then a subsequent position of the object after movement. However, it may still be difficult for the reader to understand how the different parts of the object move. Additionally, these animations provided in the printed material, in either a digital format or physical format, suffer from the same drawbacks as the static illustrations or images, for example, only so many animations are provided and the provided animations may not be animations that illustrate a concept that the reader desires to be animated. Additionally, the animation may illustrate the correct object to be animated, but may not animate the portion of the object that the reader wants to be animated. Finally, it may be difficult for the reader to determine if the illustration or animation that is provided actually corresponds to the concept that the reader is reading.

Accordingly, the techniques and systems as described herein provide a system and technique for generating animations of concepts within printed material being read by a reader and providing the animation to the reader. The system tracks a reading position of the reader within the text of the printed material (e.g., physical printed material, digital printed material, audio printed material, etc.). When the system detects an area of the printed material that is of interest to the reader, identified based upon receiving an interest indication from the reader, the system identifies a concept corresponding to the area of interest. The system can then generate an animation for the concept by accessing an image related to the concept, identifying a portion of the image to animate, and thereafter animating the portion of the image. Once the animation has been generated, it can be provided to the reader on an information handling device. Thus, the reader is automatically provided an animation for a concept that is of interest to the reader without the reader having to access a secondary source to attempt to find an illustration or animation of the desired concept. Specifically, the system is able to identify an area of interest to the user and then determine what type of animation would be useful to the reader for understanding the area of interest and, thereafter, generate and provide such an animation.

Such a system provides a technical improvement over current systems for illustration of concepts within printed materials. In conventional techniques the author or publisher attempts to identify concepts that should be illustrated or animated. However, these may not correspond to illustrations or animations that are useful to or desired by the reader. Thus, the described system provides technical improvement over current systems by providing a system that can track a reading position of a reader and determine a concept within the printed material for which the reader wants an animation. The system then generates an animation corresponding to the concept and provides the animation to the reader. Accordingly, the system does not rely on readers to select illustrations or animations to include in the printed material, but, rather, is able to identify animations that would be useful to the specific reader consuming the printed material and provide such an animation. Thus, the reader is provided an animation without needing to access a secondary source and attempting to find the image or animation on his/her own, thereby decreasing the amount of time consumed by the reader, decreasing the frustration of the reader, and providing a more enjoyable and easier reading and/or learning experience. Additionally, the reader is assured that the provided animation or illustration matches the concept that the reader is reading.

FIG. 1 illustrates a method for generating animations of concepts within printed material being read by a reader and providing the animation to the reader. At 101 the system may track a reading position of a reader with respect to text of printed material. Tracking the reading position may be accomplished using a variety of techniques the selected technique may be dependent on the type of printed material or how the reader is reading the printed material. For example, if the reader is reading the printed material silently, the system may use a gaze tracking technique to identify where the reader's gaze is within the printed material, which may then be correlated to the text within the printed material to identify the reading position. In the case of digital printed material, correlation to the text may be accomplished by accessing the digital source file and identifying the text that corresponds to the gaze position. In the case of physical printed material, correlation may include accessing corresponding digital printed material and identifying the text, or it may include taking an image of the physical page and performing an image analysis to identify the text that corresponds to the gaze position.

In the case that the reader is reading the printed material out loud, the system may using an audio capture device to capture the audio output by the reader. This audio can then be correlated to the text of either the digital or physical printed material, for example, using the techniques described above, to identify the reading position of the user. The printed material may also be an audio version of digital or physical printed material. For example, some books have corresponding audio versions that the reader can listen to, rather than having to visually read the printed material. In the case of an audio book, the system can track the reader's position using an audio capture device to listen to the audio output and parse the audio output to identify a reading position within the printed material, in this case, the audio file. Alternatively, since the printed material is provided in audio form, the system may access the audio source file and identify the reading position location within the audio file based upon markers within the audio file. As another alternative, the system can access a corresponding digital printed material and correlate the audio output to a position within the digital printed material.

At 102 the system may identify whether an area of interest of the printed material has been detected. Detecting an area of interest of the reader may include correlating a reading position of the reader with an interest indication provided by the reader. In other words, the system may track the reading position of the reader and, when an interest indication is provided, may mark the area corresponding to the reading position as a detected area of interest. An interest indication provided by the user may include any gesture, speech, facial expression, or other indication provided by the reader which would indicate that the reader is interested in a particular area. For example, the interest indication may include an indication that an area is confusing or that the reader does not understand a particular area of the printed material.

As an example of an interest indication, the system may use a sentiment analysis technique to analyze facial expressions of the reader to determine that the reader is confused about, or is very interested in, a particular area. As another example, the system may use a speech analysis technique to parse speech provided by the reader to determine that the reader has asked a question or made a statement regarding a particular area in the printed material. As another example, the system may use a gaze tracking technique to determine that the reader has spent a particular amount of time at a particular area of the printed material or that the reader has read a particular area of the printed material multiple times.

An area may be identified as an area of interest based upon comparison of the interest indication to a threshold value. For example, the system may observe facial expressions of the reader, but may not determine that an area is an area of interest until the facial expression indicates that an emotion or sentiment of the reader is above a predetermined threshold. In other words, while a reader is consuming printed material, the reader may be interested in different portions of the printed material. However, the reader may not want all these areas of interest to result in animations. Rather, the reader may only want animations when the reader is particularly confused or interested in an area. Similarly, other interest indications can also be compared to thresholds and only result in animations when the threshold is met or exceeded. For example, if the interest indication is based upon gaze tracking, the system may only identify an area as an area of interest if the gaze dwell meets or exceeds a predetermined threshold. As discussed later, the intensity, gaze dwell, or other interest indication exceeding the threshold may also be used to identify which portion of the image to animate.

If an area of interest is not detected at 102, the system may continue to track the reading position of the reader at 101 until an area of interest is detected or until the reader has stopped reading the printed material. If, however, an area of interest is detected at 102, the system may identify a concept corresponding to the area of interest at 103. To identify a concept corresponding to the area of interest the system may parse the text of the area of interest using one or more parsing techniques. In the case that a physical printed material is being read, the system may either access a corresponding digital copy of the printed material on which to perform the parsing or may obtain an image of the physical printed material, use image analysis and optical character recognition techniques to identify the text, and then parse the identified text.

The system may use a natural language parser to identify different portions of the text, for example, entities, actions, qualifiers, and the like. For example, the system may use one or more of a name-entity recognition identifier, parts-of-speech identifier, entity-action resolution techniques, semantic analysis techniques, syntactic analysis techniques, information extraction programs, or the like, to identify the different portions of the text. Parsing of the text may occur either before the reader starts reading the printed material, while the reader is reading the printer material, or once the system identifies an area of interest. For example, in the case of digital printed material, the parsing may occur once the printed material is published in digital form, once the reader adds the printed material to a reading list, or otherwise before the reader is reading the text. Such parsing before reading the printed material may also be possible with physical printed material in the case that the physical printed material has a corresponding digital copy. Otherwise, the physical printed material may be parsed as the reader is reading the printed material and an image capture device (e.g., stand-alone camera, camera on an information handling device, video recorder, etc.) can capture images of the physical pages of the printed material. Once the text has been parsed, the system may extract one or more concepts from the text corresponding to the identified area of interest.

Once a concept corresponding to the area of interest has been identified, the system may generate an animation for the concept at 104. To generate an animation the system may access an image related to the concept. To access or obtain the image, the system may access a secondary source that may contain a corresponding image. For example, the system may have access to a database or other repository (e.g., network repository, local repository, cloud repository, remote repository, etc.) that includes images and illustrations of different concepts. As another example, the system may send a query to an Internet search engine to find a corresponding image, filter returned images to find a relevant image, and then select an image for animation. Additionally or alternatively, the image may be an image already included in the printed material.

Once the image has been retrieved, the system may identify a portion of the image to animate. The portion of the image may not only include a sub-portion of the image, but may also include the entire image. Identifying the portion of the image to animate may be based upon the concept that has been identified or the interest indication that was provided by the reader. For example, if the system identifies a particular action of the concept, the system may then identify which portion of the image corresponds to that action. As an example, if the identified concept is wind causing windmill blades to turn causing the windmill to pump water, the system may determine that one action is the windmill blades turning and another action is the windmill pumping water. Accordingly, the system may determine that the portion of the windmill that turns from the wind is the blades of the windmill and the portion of the windmill that moves as a result of water being pumped is the pipes. Therefore, the system may identify the windmill blades and the pipe as being the portions of the image to be animated.

Identifying the portion of the image to be animated using the interest indication may include animating the portion of the image that the reader specifically identified. For example, if the reader is reading about a centrifuge and asks "which direction does a centrifuge turn?" the system may determine that the portion of the image of a centrifuge that should be animated is the portion that turns when the centrifuge is in use. As another example, if the system determines that the reader is confused about a particular concept using a facial expression analysis technique, the system may determine that the animation should include an animation of that particular concept.

Once the portion of the image to be animated has been determined, which may be the entire image, the system may then animate that portion of the image. In animating the image the system may generate a video that includes a series of images that show the movement of the image. For example, in the windmill example, the system may generate a video or provide a series of images that illustrates the blades of the windmill turning and the pipes of the windmill moving up and down as the blades turn. In other words, the image may be animated to perform the action of the concept identified. Animating the image may include highlighting or otherwise modifying the image to show the desired action or concept. For example, in the centrifuge example, the system may add arrows to the image that illustrate the direction of movement when the centrifuge is in use.

Once the animation has been generated the system may provide the animation to the reader at 105. Provision of the animation may be performed on an information handling device. For example, if the reader is reading digital printed material, the reader is likely using an information handling device to read the digital printed material. Thus, the animation may be provided on that information handling device in conjunction with the digital printed material. As another example, if the reader is reading physical printed material or an audio printed material, the system may provide the animation on an information handling device of the reader. For example, the reader may have an information device that includes an application that is a digital reading companion. The animation may then be provided within this application. However, any information handling device can be used by the system to provide the animation, regardless of whether the information handling device is running a companion application.

Thus, the described system and method provides an improvement to conventional systems for providing illustrations with printed materials. The described systems and methods provide a system that can identify an area of interest of a reader and generate and provide an animation that is useful to the reader in understanding or illustrating the concept of the area of interest. Thus, the reader can be provided useful animations in real-time, while the reader is consuming the printed material. Additionally, since the animations are provided while the reader is consuming the printed material, the animations that are provided correspond to the concept that the reader is currently reading, so that the reader does not have determine whether the illustration corresponds to the current concept or not. Finally, since the animations are based upon the area of interest of the reader, the animations can be generated to provide illustrations or animations of the specific portion of the object that needs to be animated to illustrate the concept.

Figure 2:
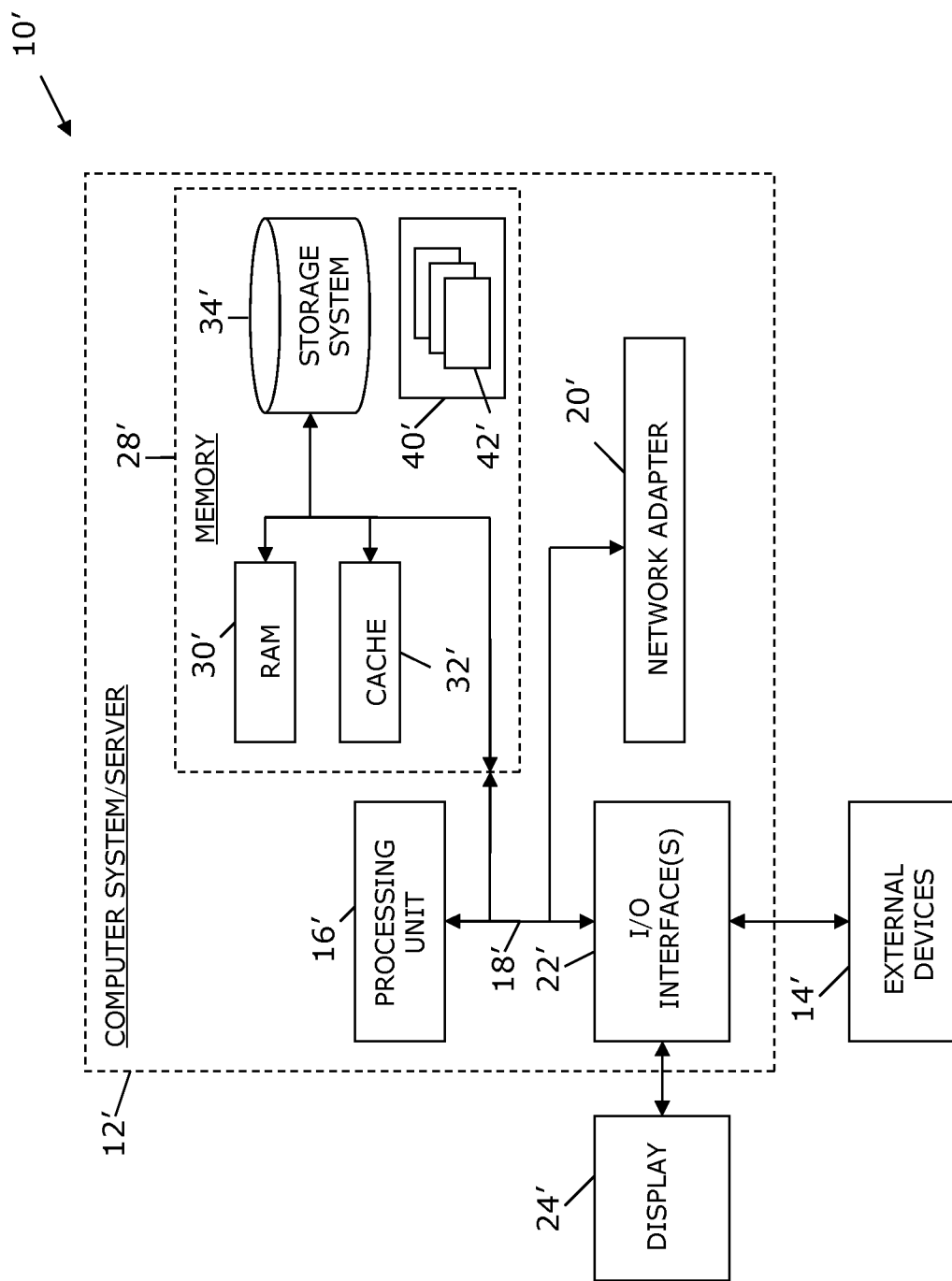
FIG. 2 illustrates a computer system.

As shown in FIG. 2, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
   tracking a reading position of a reader with respect to text of printed material;
   detecting an area of the printed material of interest to the reader, wherein the detecting comprises correlating a reading position with an indication of interest provided by the reader, wherein the indication is based upon sentiment of the reader identified through at least one of: facial analysis, speech analysis, and gaze analysis, wherein the detecting an area of interest comprises determining the sentiment indicating the interest exceeds a predetermined threshold value;
   identifying a concept corresponding to the area of interest, wherein the identifying a concept comprises (i) parsing the text of the area of interest and (ii) extracting at least one concept from the text, wherein the parsing comprises utilizing a natural language parser to extract portions of the text, wherein the at least one concept corresponds to an entity within the area of interest identified and identified in a portion of the text;
   generating an animation for the concept by (i) accessing an image related to the concept, (ii) identifying a portion of the image to animate, and (iii) animating the portion of the image, wherein the accessing an image comprises querying a secondary source utilizing the entity as a query search term, wherein the generating an animation comprises identifying at least one action of the at least one concept extracted from the text, wherein the identifying a portion of the image to animate comprises identifying a portion of the image corresponding to the identified at least one action and determining the portion corresponds to a portion identified by the user within the indication of interest, wherein the generating comprises generating a series of images illustrating movement of the portion of the image performing the at least one action; and
   providing, on an information handling device, the generated animation to the reader.

2. The method of claim 1, the tracking comprising using a speech recognition program to spoken speech of the reader.

3. The method of claim 1, the tracking comprising using gaze tracking to track a gaze of a reader with respect to the text.

4. The method of claim 1, wherein the indication comprises a question provided by the reader.

5. The method of claim 1, wherein the generating an animation comprises (i) accessing a digital copy of the printed material and (ii) animating an image included in the digital copy.

6. The method of claim 1, wherein the parsing the text comprises parsing a digital format of the printed material.

7. The method of claim 1, wherein the parsing the text comprises (i) receiving an image of the printed material and (ii) parsing, using an optical character recognition technique, the image of the printed material.

8. The method of claim 1, wherein the querying the secondary source for the image associated with the at least one extracted concept comprises querying at least one of: an external database, an Internet search engine, and an image present in the text.

9. An apparatus, comprising:
   at least one processor; and
   a computer readable storage medium having computer readable program code embodied therewith and executable by the at least one processor, the computer readable program code comprising:
   computer readable program code configured to track a reading position of a reader with respect to text of printed material;
   computer readable program code configured to detect an area of the printed material of interest to the reader, wherein the detecting comprises correlating a reading position with an indication of interest provided by the reader, wherein the indication is based upon sentiment of the reader identified through at least one of: facial analysis, speech analysis, and gaze analysis, wherein the detecting an area of interest comprises determining the sentiment indicating the interest exceeds a predetermined threshold value;
   computer readable program code configured to identify a concept corresponding to the area of interest, wherein the identifying a concept comprises (i) parsing the text of the area of interest and (ii) extracting at least one concept from the text, wherein the parsing comprises utilizing a natural language parser to extract portions of the text, wherein the at least one concept corresponds to an entity within the area of interest identified and identified in a portion of the text;

computer readable program code configured to generate an animation for the concept by (i) accessing an image related to the concept, (ii) identifying a portion of the image to animate, and (iii) animating the portion of the image, wherein the accessing an image comprises querying a secondary source utilizing the entity as a query search term, wherein the generating an animation comprises identifying at least one action of the at least one concept extracted from the text, wherein the identifying a portion of the image to animate comprises identifying a portion of the image corresponding to the identified at least one action and determining the portion corresponds to a portion identified by the user within the indication of interest, wherein the generating comprises generating a series of images illustrating movement of the portion of the image performing the at least one action; and computer readable program code configured to provide, on an information handling device, the generated animation to the reader.

10. A computer program product, comprising:

a computer readable storage medium having computer readable program code embodied therewith, the computer readable program code executable by a processor and comprising:

computer readable program code configured to track a reading position of a reader with respect to text of printed material;

computer readable program code configured to detect an area of the printed material of interest to the reader, wherein the detecting comprises correlating a reading position with an indication of interest provided by the reader, wherein the indication is based upon sentiment of the reader identified through at least one of: facial analysis, speech analysis, and gaze analysis, wherein the detecting an area of interest comprises determining the sentiment indicating the interest exceeds a predetermined threshold value;

computer readable program code configured to identify a concept corresponding to the area of interest, wherein the identifying a concept comprises (i) parsing the text of the area of interest and (ii) extracting at least one concept from the text, wherein the parsing comprises utilizing a natural language parser to extract portions of the text, wherein the at least one concept corresponds to an entity within the area of interest identified and identified in a portion of the text;

computer readable program code configured to generate an animation for the concept by (i) accessing an image related to the concept, (ii) identifying a portion of the image to animate, and (iii) animating the portion of the image, wherein the accessing an image comprises querying a secondary source utilizing the entity as a query search term, wherein the generating an animation comprises identifying at least one action of the at least one concept extracted from the text, wherein the identifying a portion of the image to animate comprises identifying a portion of the image corresponding to the identified at least one action and determining the portion corresponds to a portion identified by the user within the indication of interest, wherein the generating comprises generating a series of images illustrating movement of the portion of the image performing the at least one action; and computer readable program code configured to provide, on an information handling device, the generated animation to the reader.

11. The computer program product of claim 10, the tracking comprising using a speech recognition program to spoken speech of the reader.

12. The computer program product of claim 10, the tracking comprising using gaze tracking to a gaze of a reader with respect to the text.

13. The computer program product of claim 10, wherein the indication comprises a question provided by the reader.

14. The computer program product of claim 10, wherein the generating an animation comprises (i) accessing a digital copy of the printed material and (ii) animating an image included in the digital copy.

15. The computer program product of claim 10, wherein the parsing the text comprises (i) receiving an image of the printed material and (ii) parsing, using an optical character recognition technique, the image of the printed material.

16. The computer program product of claim 10, wherein the querying the secondary source for the image associated with the at least one extracted concept comprises querying at least one of: an external database, an Internet search engine, and an image present in the text.

17. A method, comprising:

identifying an area within printed material (i) corresponding to a reading position of a reader who is reading the printed material and (ii) that is determined to be an area having a concept whose animation would benefit the reader, wherein determining the area is based upon sentiment of the reader identified through at least one of: facial analysis, speech analysis, and gaze analysis, wherein determining an area having a concept comprises determining the sentiment indicating an interest of the reader exceeds a predetermined threshold value with respect to the area;

generating an animation of the concept, wherein the generating the animation comprises (i) accessing an image related to the concept, (ii) determining a portion of the image to animate based upon identifying at least one action of the concept, and (iii) animating the portion of the image to illustrate the at least one action of the concept, wherein the accessing an image comprises utilizing a natural language parser to extract portions of the printed material, wherein the concept corresponds to an entity within the area of interest identified and identified in a portion of the printed material, and wherein the accessing an image comprises querying a secondary source utilizing the entity as a query search term, wherein the animating a portion of the image comprises identifying a portion of the image corresponding to the identified at least one action and determining the portion corresponds to a portion identified by the user within the indication of interest, wherein the generating comprises generating a series of images illustrating movement of the portion of the image performing the at least one action; and providing, on an information handling device, the animation to the reader.

\* \* \* \* \*